(12) United States Patent
Coutu (10) Patent No.: US 11,486,265 B1
(45) Date of Patent: Nov. 1, 2022

(54) SEALING VARIABLE GUIDE VANES (71) Applicant: PRATT & WHITNEY CANADA CORP., Longueuil (CA)

(72) Inventor: Daniel Coutu, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/383,713

(22) Filed: Jul. 23, 2021

(51) Int. Cl.
*F01D 17/16* (2006.01)
*F01D 9/04* (2006.01)
*F01D 17/14* (2006.01)
*F01D 11/00* (2006.01)
*B64C 27/12* (2006.01)
*B64C 27/02* (2006.01)
*B64C 27/04* (2006.01)
*B64C 27/08* (2006.01)

(52) U.S. Cl.
CPC .......... *F01D 17/162* (2013.01); *B64C 27/027* (2013.01); *B64C 27/12* (2013.01); *F01D 9/041* (2013.01); *F01D 11/005* (2013.01); *F01D 17/14* (2013.01); *B64C 27/04* (2013.01); *B64C 27/08* (2013.01); *F05D 2220/323* (2013.01); *F05D 2240/125* (2013.01); *F05D 2240/55* (2013.01); *F05D 2250/131* (2013.01)

(58) Field of Classification Search
CPC ........ F01D 9/041; F01D 11/005; F01D 17/14; F01D 17/162; B64C 27/027; B64C 27/12; B64C 27/04; B64C 27/08; F05D 2220/323; F05D 2240/125; F05D 2240/55; F05D 2250/131
See application file for complete search history.

(56) References Cited

U.S. PATENT DOCUMENTS 1,688,736 A * 10/1928 Moody ................... F03B 3/183
                                                              415/163
3,286,982 A * 11/1966 Scheper, Jr. ............. F01D 1/30
                                                              415/154.2
3,286,983 A * 11/1966 Scheper, Jr. ............. F01D 1/30
                                                              415/154.2
3,752,597 A *  8/1973 Heinold .................. F01D 17/12
                                                              415/154.2

(Continued)

FOREIGN PATENT DOCUMENTS

EP           1245784 A2 * 10/2002  ........... F01D 17/162

*Primary Examiner* — Igor Kershteyn
*Assistant Examiner* — Brian Christopher Delrue
(74) *Attorney, Agent, or Firm* — Norton Rose Fulbright Canada LLP (57) ABSTRACT

A variable guide vane assembly has: variable guide vanes having airfoils extending from inner ends to outer ends, the variable guide vanes pivotable about respective spanwise axes between one or more open positions and a closed position, in the closed position, trailing edge regions of the airfoils sealingly engage leading edge regions of adjacent ones of the airfoils to block an air flow; an outer wall extending around the central axis, the outer ends of the variable guide vanes pivotably engaged to the outer wall; and an inner wall extending around the central axis, the inner ends of the variable guide vanes pivotably engaged to the inner wall, the inner wall defining inner faces distributed about the central axis, a shape of the inner faces complementary to a shape of the inner ends of the airfoils to form a seal when the variable guide vanes are in the closed position.

16 Claims, 7 Drawing Sheets

(56) References Cited

U.S. PATENT DOCUMENTS

| | | | | |
|---|---|---|---|---|
| 3,790,298 | A * | 2/1974 | Hendrickson | F01D 1/30 |
| | | | | 415/154.2 |
| 6,007,297 | A * | 12/1999 | Buchelt | F03B 3/06 |
| | | | | 415/164 |
| 6,457,938 | B1 * | 10/2002 | Liu | F01D 5/141 |
| | | | | 415/148 |
| 9,708,914 | B2 * | 7/2017 | Fulayter | F01D 5/12 |
| 9,957,969 | B2 * | 5/2018 | Krausche | F02B 47/08 |
| 10,060,278 | B2 * | 8/2018 | Boeck | F01D 11/00 |
| 2020/0049025 | A1 * | 2/2020 | Morgan | B64C 27/12 |
| 2021/0078720 | A1 * | 3/2021 | Brillon | F02C 7/36 |

* cited by examiner

SEALING VARIABLE GUIDE VANES

TECHNICAL FIELD

The disclosure relates generally to multi-engine systems for aircrafts and methods of controlling such systems. More particularly, the disclosure relates to variable guide vanes used in the engines for such systems.

BACKGROUND

Multi-engine helicopters are often provided with two or more gas turbine turboshaft engines connected to a main rotor via a common gearbox, and each of the engines is sized to provide power greater than what is required for cruising using both/all engines. During normal cruise operating regimes, both engines typically operate at similar power output levels (e.g. each engine provides 50% of the total power output). Attempts have however been made to operate the engines asymmetrically, that is, operating one engine at a higher power than the other. Doing so can provide overall better fuel efficiency. However, the engine operating at lower power needs to be able to rapidly speed back up, when called upon. While such systems are suitable for their intended purposes, improvements are desirable.

SUMMARY

In one aspect, there is provided a variable guide vane assembly for an aircraft engine, comprising: variable guide vanes circumferentially distributed about a central axis, the variable guide vanes having airfoils extending from inner ends to outer ends, the variable guide vanes pivotable about respective spanwise axes between one or more open positions and a closed position, wherein in the closed position, trailing edge regions of the airfoils sealingly engage leading edge regions of adjacent ones of the airfoils to block an air flow between the variable guide vanes; an outer wall circumferentially extending around the central axis, the outer ends of the variable guide vanes being pivotably engaged to the outer wall; and an inner wall circumferentially extending around the central axis, the inner ends of the variable guide vanes being pivotably engaged to the inner wall, the inner wall defining inner faces circumferentially distributed about the central axis, a shape of the inner faces being complementary to a shape of the inner ends of the airfoils to form a seal between the inner ends of the airfoils and the inner faces when the variable guide vanes are in the closed position.

The variable guide vane assembly described above may include any of the following features, in whole or in part, and in any combination.

In some embodiments, an inner chord of the airfoils at the inner ends are less than outer chords of the airfoils at the outer ends.

In some embodiments, the inner wall has a polygon shape defining the inner faces.

In some embodiments, each of the inner faces is oriented in a direction being solely radial relative to the central axis.

In some embodiments, the outer wall defines outer faces circumferentially distributed about the central axis, a shape of the outer faces being complementary to a shape of the outer ends of the airfoils to form a seal between the outer ends of the airfoils and the outer faces when the variable guide vanes are in their closed positions.

In some embodiments, the outer wall has a polygon shape defining the outer faces.

In some embodiments, each of the outer faces is oriented in a direction being solely radial relative to the central axis.

In some embodiments, a seal is located between the outer ends of the airfoils and the outer faces of the outer wall.

In some embodiments, the seal is secured to the outer ends of the airfoils.

In some embodiments, the leading edge regions include portions of suction sides of the airfoils.

In some embodiments, the trailing edge regions include portions of pressure sides of the airfoils.

In some embodiments, a seal is secured to the trailing edge regions of the airfoils.

In some embodiments, the seal is made of an elastomeric material.

In some embodiments, leading edges of the airfoils are free of contact with the adjacent ones of the airfoils.

In some embodiments, a seal is located between the inner ends of the airfoils and the inner faces of the inner wall.

In some embodiments, the seal is secured to the inner ends of the airfoils.

In another aspect, there is provided a method of operating a variable guide vane assembly of an aircraft engine, the variable guide vane assembly having vanes circumferentially distributed about a central axis and pivotable about respective spanwise axes, the method comprising: orienting the vanes relative to an incoming air flow as a function of operating conditions of a compressor downstream of the vanes; determining that the air flow should be blocked; and preventing the air flow from passing through the vanes of the variable guide vane assembly, by pivoting the vanes about their respective spanwise axes until leading edge regions of airfoils of the vanes are sealingly engaged with trailing edge regions of adjacent ones of the airfoils, to thereby block the air flow.

The method may include any of the following features, in whole or in part, and in any combination.

In some embodiments, the determining that the incoming air flow should be blocked includes determining that the aircraft engine is to be operated in a low power mode.

In some embodiments, the pivoting of the vanes includes pivoting the vanes until inner ends of the airfoils are sealingly engaged to inner faces defined by an inner wall.

In some embodiments, the pivoting of the vanes further includes pivoting the vanes until outer ends of the airfoils are sealingly engaged to outer faces defined by an outer wall.

BRIEF DESCRIPTION OF THE DRAWINGS

Reference is now made to the accompanying figures in which.

DETAILED DESCRIPTION

Figure 1:
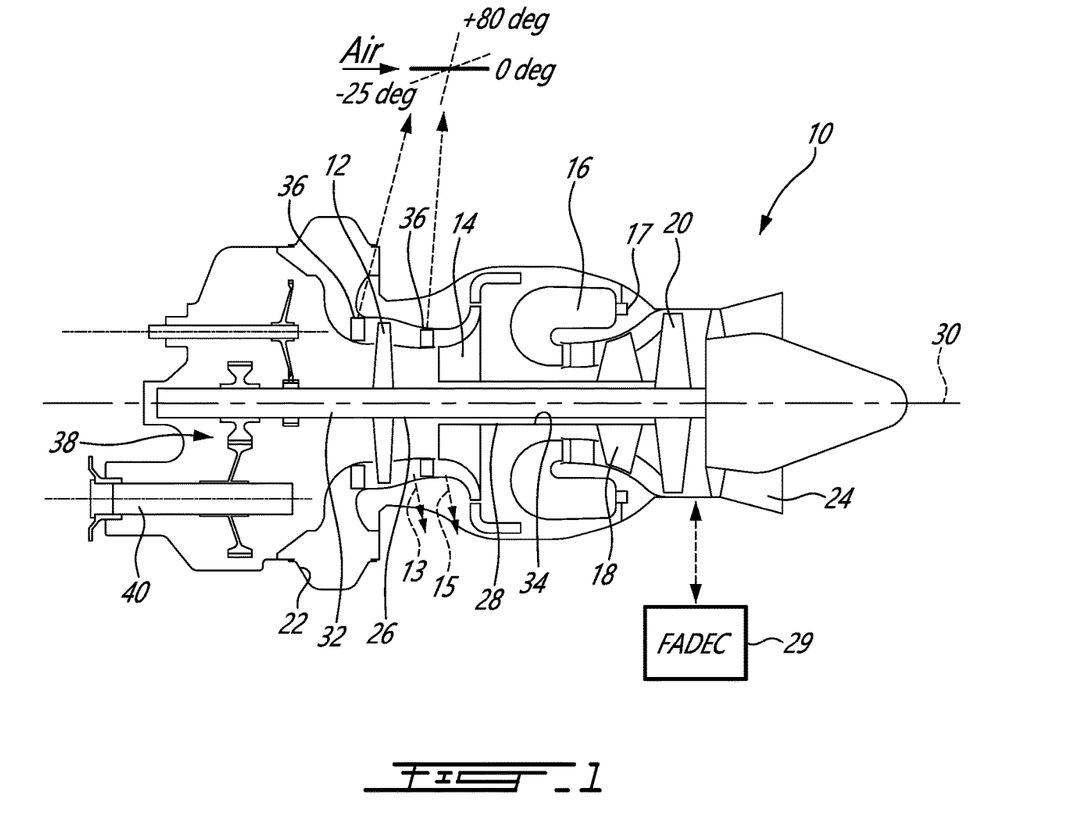
FIG. 1 is a schematic cross sectional view of a gas turbine engine depicted as a turboshaft engine.

FIG. 1 illustrates a gas turbine engine. In this example, the gas turbine engine is a turboshaft engine 10 generally comprising in serial flow communication a low pressure (LP) compressor section, which will be referred below as the LP compressor 12 and a high pressure (HP) compressor section, which will be referred below as the HP compressor 14 for pressurizing air received via an air inlet 22. The air compressed by the LP compressor 12 and by the HP compressor 14 is fed to a combustor 16 in which the compressed air is mixed with a fuel flow, delivered to the combustor 16 via fuel nozzles 17 from fuel system (not depicted), and ignited for generating a stream of hot combustion gases. A high pressure turbine section, which will referred to below as the HP turbine 18, extracts energy from the combustion gases. A low pressure turbine section, which will be referred to below as the LP turbine 20 is located downstream of the HP turbine 18 for further extracting energy from the combustion gases and driving the LP compressor 12. The combustion gases are then exhausted by an exhaust outlet 24.

In the embodiment shown, the turboshaft engine 10 includes a low-pressure spool, referred to below as LP spool 26, and a high-pressure spool, referred to below as a HP spool 28. The LP spool 26 includes a low-pressure shaft, referred to below as LP shaft 32. The HP spool 28 includes a high-pressure shaft, referred to below as HP shaft 34. The HP turbine 18 is drivingly engaged to the HP compressor 14 via the HP shaft 34. The LP turbine 20 is drivingly engaged to the LP compressor 12 via the LP shaft 32. The HP spool 28, and the components mounted thereon, are configured to rotate independently from the LP spool 26 and from the components mounted thereon. These two spools may thus rotate at different speeds about an engine central axis 30. The HP shaft 34 and the LP shaft 32 may be concentric. In the embodiment shown, the HP shaft 34 extends around the LP shaft 32. The term "spool" is herein intended to broadly refer to drivingly connected turbine and compressor rotors, and need not mean the simple shaft arrangements depicted.

In the embodiment shown, the HP compressor 14 rotates at the same speed as the HP turbine 18. And, the LP compressor 12 rotates at the same speed as the LP turbine 20. However, this may not be the case if transmission(s) are provided on the LP spool 26 and HP spool 28 to create speed ratios between the interconnected compressors and turbines. This may increase or decrease rotational speeds of the compressors relative to that of the turbines. Any suitable transmissions may be used for this purpose.

The LP compressor section 12 may include one or more compression stages, and the HP compressor section 14 may include one or more compression stages. In the embodiment shown in FIG. 1, the LP compressor 12 includes a single compressor stage 12A (FIG. 2), which may include a single mixed flow rotor (MFR), for example such as described in U.S. Pat. No. 6,488,469 B1, entitled "MIXED FLOW AND CENTRIFUGAL COMPRESSOR FOR GAS TURBINE ENGINE", the contents of which are hereby expressly incorporated herein by reference in its entirety.

The turboshaft engine 10 may include a transmission 38 driven by the low pressure shaft 32 and driving a rotatable output shaft 40. The transmission 38 may optionally be provided to vary a ratio between rotational speeds of the low pressure shaft 32 and the output shaft 40.

The LP compressor 12 and the HP compressor 14 are configured to deliver desired respective pressure ratios in use, as will be described further below. The LP compressor 12 may have a bleed valve 13 (shown schematically) which may be configured to selectively bleed air from the LP compressor 12 according to a desired control regime of the engine 10, for example to assist in control of compressor stability. The design of such valve 13 is well known and not described herein in further detail. Any suitable bleed valve arrangement may be used.

As mentioned, the HP compressor 14 is configured to independently rotate from the LP compressor 12 by virtue of their mounting on different engine spools. The HP compressor 14 may include one or more compression stages, such as a single stage, or two or more stages 14A as shown in more detail in FIG. 2. It is contemplated that the HP compressor 14 may include any suitable type and/or configuration of stages. The HP compressor 14 is configured to deliver a desired pressure ratio in use, as will be described further below. The HP compressor 14 may have a bleed valve 15 (shown schematically) which may be configured to selectively bleed air from the HP compressor 14 according to a desired control regime of the engine 10, for example to assist in control of compressor stability. The design of such valve 15 is well known and not described herein in further detail. Any suitable bleed valve arrangement may be used.

In use, suitable one or more controllers 29, such as one or more full authority digital controllers (FADEC) providing full authority digital control of the various relevant parts of the engine 10, controls operation of the engine 10. The FADEC(s) may be provided as for example conventional software and/or hardware, so long as the FADEC(s) is/are configured to perform the various control methods and sequences as described in this document. Each controller 29 may be used to control one or more engines 10 of an aircraft (H). Additionally, in some embodiments the controller(s) 29 may be configured for controlling operation of other elements of the aircraft (H), for instance the main rotor 44.

Figure 2:
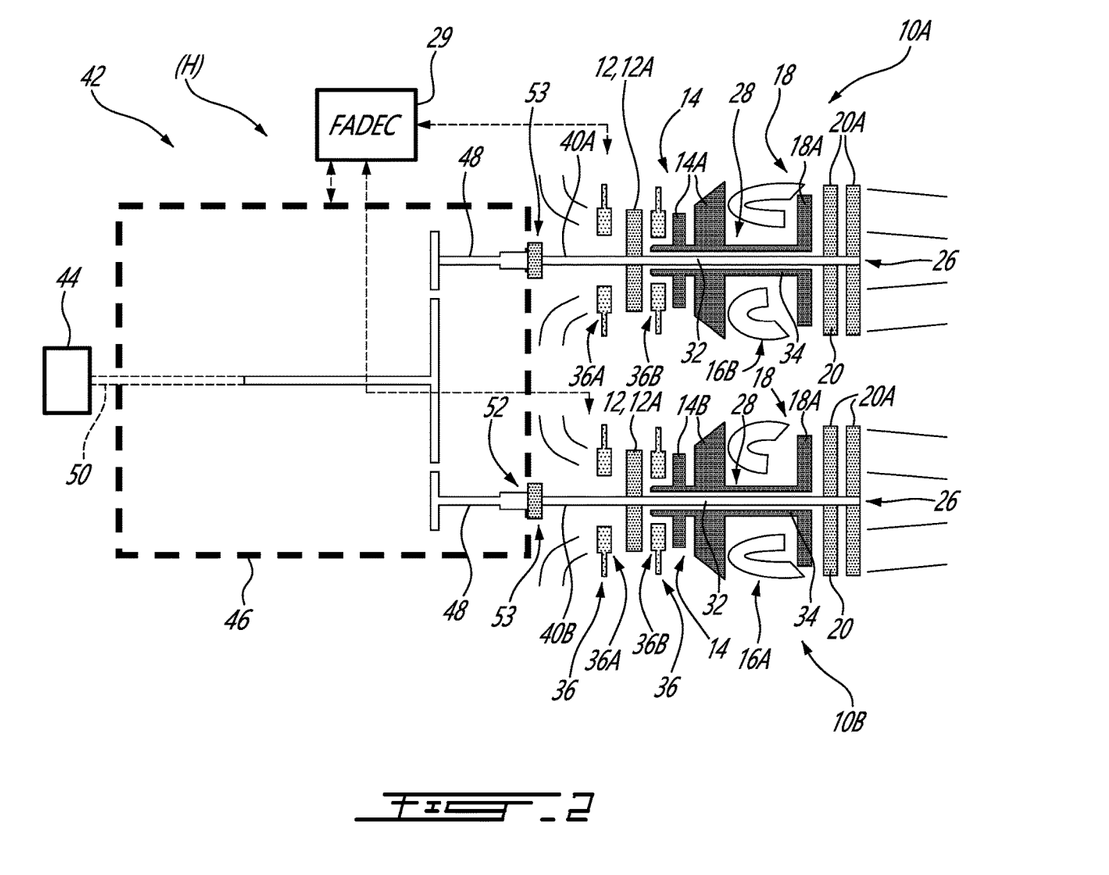
FIG. 2 is a schematic representation of an exemplary multi-engine system, showing two of the FIG. 1 engines.

Referring to FIGS. 1-2, the turboshaft engine 10 may include variable guide vanes (VGVs) 36. In the embodiment shown, a first set of VGVs 36A is located upstream of the LP compressor 12, and a second set of VGVs 36B is located upstream of the HP compressor 14. The VGVs 36 may be independently controlled by suitable one or more controllers 29, as described above. The VGVs 36 may direct inlet air to the corresponding stage of the LP compressor 12 and of the HP compressor 14. The VGVs 36 may be operated to modulate the inlet air flow to the compressors in a manner which may allow for improved control of the output power of the turboshaft engine 10, as described in more detail below. The VGVs 36 may be provided with any suitable operating range. In some embodiments, VGVs 36 may be configured to be positioned and/or modulated between about +80 degrees and about −25 degrees, with 0 degrees being defined as aligned with the inlet air flow, as depicted schematically in FIG. 1. In a more specific embodiment, the VGVs 36 may rotate in a range from +78.5 degrees to −25 degrees, or from +75 degrees to −20 degrees, and more particularly still from 70 degrees to −20 degrees. The two set of VGVs 36 may be configured for a similar range of positions, or other suitable position range.

In some embodiments, the first set of VGVs 36A upstream of the LP compressor 12 may be mechanically decoupled from the second set of VGVs 36B upstream of the HP compressor 14 and downstream of the LP compressor 12, having no mechanical link between the two sets of VGVs to permit independent operation of the respective stages. The VGVs 36 may be operatively controlled by the controller(s) 29 described above, to be operated independently of each other. Indeed, the turboshaft engine 10 is also controlled using controller(s) 29 described above, to carry out the methods described in this document. For the purposes of this document, the term "independently" in respects of the VGVs 36 means that the position of one set of the VGV vanes (e.g. 36A) may be set without effecting any change to a position of the other set of the VGV vanes (e.g. 36B), and vice versa.

Independent control of the VGVs 36 may allow the spools 26, 28 to be operated to reduce or eliminate or reduce aerodynamic coupling between the spools 26, 28. This may permit the spools 26, 28 to be operated at a wider range of speeds than may otherwise be possible. The independent control of the VGVs 36 may allow the spools 26, 28 to be operated at constant speed over a wider operating range, such as from a "standby" speed to a "cruise" power speed, or a higher speed. In some embodiments, independent control of the VGVs 36 may allow the spools 26, 28 to run at speeds close to maximum power. In some embodiments, independent control of the VGVs 36 may also allow one of the spools 26, 28 to run at high speed while the other one run at low speed.

In use, the turboshaft engine 10 is operated by the controller(s) 29 described above to introduce a fuel flow via the nozzles 17 to the combustor 16. Combustion gases turn the HP turbine 18, 18A, 18B and the LP turbine 20, 20A, 20B which in turn drive the HP compressor 14, 14A, 14B and the LP compressor 12, 12A, 12B. The controller(s) 29 control(s) the angular position of VGVs 36 in accordance with a desired control regime, as will be described further below. The speed of the engine 10 is controlled, at least in part, by the delivery of a desired fuel flow rate to the engine, with a lower fuel flow rate causing the turboshaft engine 10 to operate at a lower output speed than a higher fuel flow rate.

Such control strategies may allow for a faster "power recovery" of the turboshaft engine 10 such as when an engine is accelerated from a low output speed to a high output speed, possibly because the spools 26, 28 may be affected relatively less by their inherent inertia through the described use of spool 26, 28 speed control using VGVs 36, as will be further described below. In some embodiments, using the VGVs 36 as described herein, in combination with the use of the LP compressor 12, which may be MFR based, and of the HP compressor 14, which may be MFR based, may provide relatively more air and/or flow control authority and range through the core of the engine 10, and/or quicker power recovery.

Where MFR compressors of the turboshaft engine 10 are provided as described herein, the control of the VGVs 36 may provide for improved stability of engine operation. This may be so even where the VGVs 36 is operated at an extreme end of their ranges, such as in the "closed down" position (e.g. at a position of +80 degrees in one embodiment described herein). This control of the VGVs 36 may facilitate the ability of the turboshaft engine 10 to operate at a very low power setting, such as may be associated with a "standby" mode as described further below herein, wherein the compressor of an engine operating in standby mode is operating in a very low flow and/or low pressure ratio regime.

Turning now to FIG. 2, illustrated is an exemplary multi-engine system 42 that may be used as a power plant for an aircraft, including but not limited to a rotorcraft such as a helicopter (H). The multi-engine system 42 may include two or more engines 10A, 10B. The two engines 10A, 10B may drive a common load via a reduction gearbox 46 and an output shaft 50. Clutches 52, 53 may be used to selectively engage and disengage output shafts 48, 40A, 40B of the engines 10A, 10B from the reduction gearbox 46. In the case of a helicopter application, these engines 10A, 10B will be turboshaft engines such as the turboshaft engine 10 described above with reference to FIG. 1. They may alternatively be any suitable gas turbine engines. Control of the multi-engine system 42 is effected by one or more controller(s) 29, which may be FADEC(s), electronic engine controller(s) (EEC(s)), or the like, that are programmed to manage, as described herein below, the operation of the engines 10A, 10B to reduce an overall fuel burn, particularly during sustained cruise operating regimes, wherein the aircraft is operated at a sustained (steady-state) cruising speed and altitude. The cruise operating regime is typically associated with the operation of prior art engines at equivalent part-power, such that each engine contributes approximately equally to the output power of the system 42. Other phases of a typical helicopter mission would include transient phases like take-off, climb, stationary flight (hovering), approach and landing. Cruise may occur at higher altitudes and higher speeds, or at lower altitudes and speeds, such as during a search phase of a search-and-rescue mission.

In the present description, while the aircraft conditions, such as cruise speed and altitude, are substantially stable, the engines 10A, 10B of the system 42 may be operated asymmetrically, with one engine operated in a high-power "active" mode and the other engine operated in a lower-power "standby" mode. Doing so may provide fuel saving opportunities to the aircraft, however there may be other suitable reasons why the engines are desired to be operated asymmetrically. This operation management may therefore be referred to as an "asymmetric mode" or an "asymmetric operating regime", wherein one of the two engines is operated in a low-power "standby mode" while the other engine is operated in a high-power "active" mode. In such an asymmetric operation, which may be engaged during a cruise phase of flight (continuous, steady-state flight which is typically at a given commanded constant aircraft cruising speed and altitude). The multi-engine system 42 may be used in an aircraft, such as a helicopter, but also has applications in suitable marine and/or industrial applications or other ground operations.

Referring still to FIG. 2, according to the present description the multi-engine system 42 driving a helicopter (H) may be operated in this asymmetric manner, in which a first of the turboshaft engines (say, 10A) may be operated at high power in an active mode and the second of the turboshaft engines, for instance the engine 10B in this example, may be operated in a low-power standby mode. In one example, the first turboshaft engine 10A may be controlled by the controller(s) 29 to run at full (or near-full) power conditions in the active mode, to supply substantially all or all of a required power and/or speed demand of the common load 44. The second turboshaft engine 10B may be controlled by the controller(s) 29 to operate at low-power or no-output-power conditions to supply substantially none or none of a required power and/or speed demand of the common load 44. Optionally, a clutch may be provided to declutch the low-power engine. Controller(s) 29 may control the engine's governing on power according to an appropriate schedule or control regime. The controller(s) 29 may comprise a first controller for controlling the first engine 10A and a second controller for controlling the second engine 10B. The first controller and the second controller may be in communication with each other in order to implement the operations described herein. In some embodiments, a single controller 29 may be used for controlling the first engine 10A and the second engine 10B. The term controller as used herein includes any one of: a single controller controlling the engines, and any suitable combination of multiple controllers controlling the engines, including one or more controllers for each engine, so long as the functionality described in this document is provided.

In another example, an asymmetric operating regime of the engines may be achieved through the one or more controller's 29 differential control of fuel flow to the engines, as described in pending application Ser. No. 16/535,256, the entire contents of which are incorporated herein by reference. Low fuel flow may also include zero fuel flow in some examples.

Although various differential control between the engines of the engine system 42 are possible, in one particular embodiment the controller(s) 29 may correspondingly control fuel flow rate to each engine 10A, 10B accordingly. In the case of the standby engine, a fuel flow (and/or a fuel flow rate) provided to the standby engine may be controlled to be between 70% and 99.5% less than the fuel flow (and/or the fuel flow rate) provided to the active engine. In the asymmetric mode, the standby engine may be maintained between 70% and 99.5% less than the fuel flow to the active engine. In some embodiments of the method 60, the fuel flow rate difference between the active and standby engines may be controlled to be in a range of 70% and 90% of each other, with fuel flow to the standby engine being 70% to 90% less than the active engine. In some embodiments, the fuel flow rate difference may be controlled to be in a range of 80% and 90%, with fuel flow to the standby engine being 80% to 90% less than the active engine.

In another embodiment, the controller 29 may operate one engine, for instance the engine 10B, of the multiengine system 42 in a standby mode at a power substantially lower than a rated cruise power level of the engine, and in some embodiments at zero output power and in other embodiments less than 10% output power relative to a reference power (provided at a reference fuel flow). Alternately still, in some embodiments, the controller(s) 29 may control the standby engine to operate at a power in a range of 0% to 1% of a rated full-power of the standby engine (i.e. the power output of the second engine to the common gearbox remains between 0% to 1% of a rated full-power of the second engine when the second engine is operating in the standby mode).

In another example, the engine system 42 of FIG. 2 may be operated in an asymmetric operating regime by control of the relative speed of the engines using controller(s) 29, that is, the standby engine is controlled to a target low speed and the active engine is controlled to a target high speed. Such a low speed operation of the standby engine may include, for example, a rotational speed that is less than a typical ground idle speed of the engine (i.e. a "sub-idle" engine speed). Still other control regimes may be available for operating the engines in the asymmetric operating regime, such as control based on a target pressure ratio, or other suitable control parameters.

Although the examples described herein illustrate two engines, asymmetric mode is applicable to more than two engines, whereby at least one of the multiple engines is operated in a low-power standby mode while the remaining engines are operated in the active mode to supply all or substantially all of a required power and/or speed demand of a common load.

In use, the first turboshaft engine (say 10A) may operate in the active mode while the other turboshaft engine, such as the engine 10B, may operate in the standby mode, as described above. During this asymmetric operation, if the helicopter (H) needs a power increase (expected or otherwise), the second turboshaft engine 10B may be required to provide more power relative to the low power conditions of the standby mode, and possibly return immediately to a high- or full-power condition. This may occur, for example, in an emergency condition of the multi-engine system 42 powering the helicopter, wherein the "active" engine loses power the power recovery from the lower power to the high power may take some time. Even absent an emergency, it will be desirable to repower the standby engine to exit the asymmetric mode.

However, when one of the engines 10A, 10B is operated at low engine power (e.g., sub-idle) where limited air is flowing therethrough, the LP compressor 12 spins without doing any work. This may be referred to as a wind milling effect. This may cause parasitic drag, which may reduce a rotational speed of the LP spool 26 and, consequently, affect the HP spool 28 loading, which may need to burn additional fuel to maintain its sub-idle targeted speed.

Figure 3:
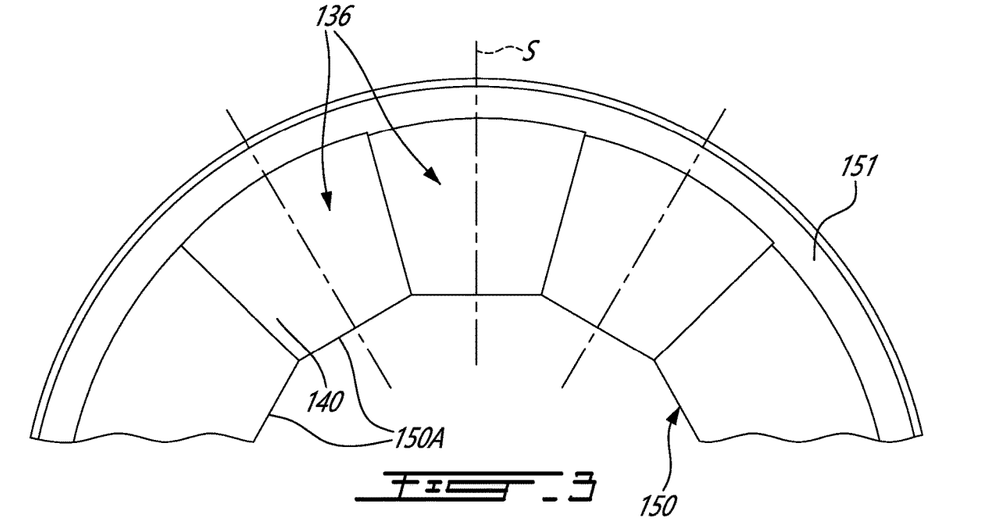
FIG. 3 is an exemplary front schematic view of a variable guide vane assembly in accordance with one embodiment.
Figure 4:
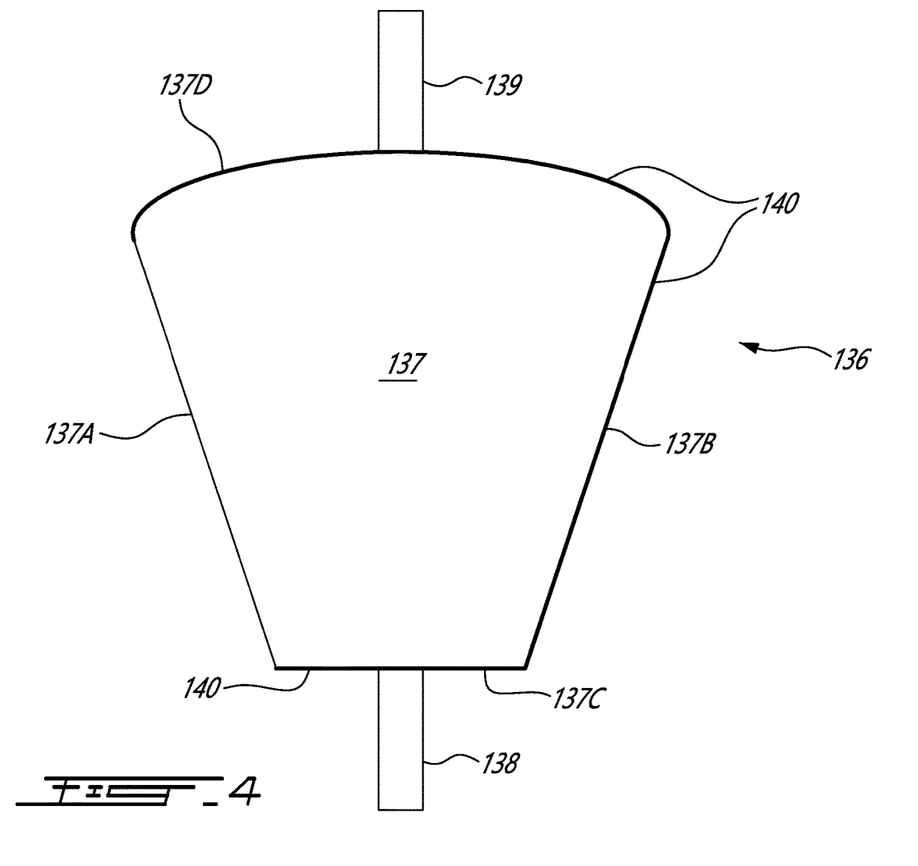
FIG. 4 is a schematic plan view of a variable guide vane of the assembly of FIG. 3.

Referring to FIGS. 3-4, a variable guide vane assembly is shown and described below. The variable guide vane assembly include vanes 136 that may be operated as a valve to substantially limit air from flowing through between the vanes 136 to block the air flow flowing in the gaspath of the engine. The vanes 136 may be closed when the engine 10 is operated in sub-idle or low power mode. After the vanes 136 are closed, the air flow may be flown directly to the HP compressor 14 via any suitable bypass to avoid having to flow through the LP compressor 12. Doing so may limit wind milling of the LP compressor 12 and my offer fuel savings. Closing the vanes 136 may further offer protection against foreign object damage (FOD) and may offer protection against back flow when injecting accumulated high pressure air. Moreover, sealing the compressor entries may reduce the required energy from the high power engine (e.g., engine 10A) to rotate the HP spool 28 of the shutdown engine (e.g., 10B) for being ready for an emergency start.

The vanes 136 are located between an inner wall 150 (e.g. an inner vane ring) and an outer wall 151 (e.g. an outer vane ring) located radially outwardly of the inner wall 150 relative to the central axis 30. The inner wall 150 and the outer wall 151 may be radially spaced apart by a distance substantially corresponding to a span-wise length of airfoils 137 of the vanes 136. The airfoils 137 extending in a span-wise direction (which may be at least partially radially) between inner stems 138 and outer stems 139. The inner stems 138 are pivotably received within sockets defined by the inner wall 150 and the outer stems 139 are pivotably received within sockets defined by the outer wall 151. The vanes 136 are pivotable about respective spanwise axes S that extend between the inner stems 138 and the outer stems 139. The spanwise axes S may be located such as to minimize aerodynamic moments imparted by the air flow F on the vanes 136 so that a minimal actuation force is required to maintain the vanes 136 in their closed positions of FIG. 5C.

The airfoils 137 include leading edges 137A and trailing edges 137B. The leading edges 137A and the trailing edges 137B extend along a spanwise direction from inner ends 137C to outer ends 137D. The airfoils 137 have pressure sides 137E (FIG. 5A) and suction sides 137F (FIG. 5A) opposed the pressure sides 137E.

Figure 5A:
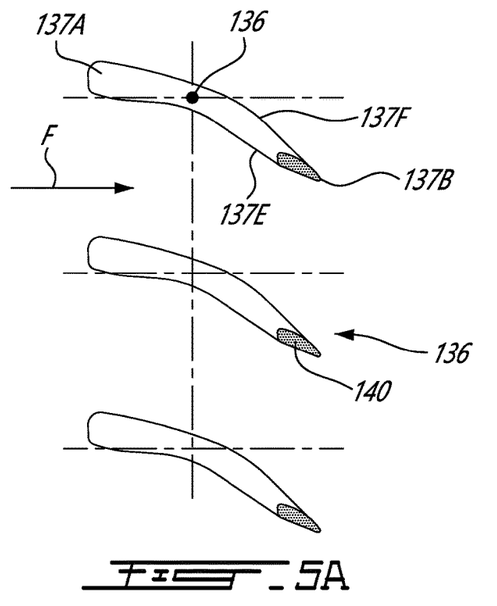
FIG. 5A is a cross-sectional view of variable guide vanes of the assembly of FIG. 3 shown in a first open position.
Figure 5B:
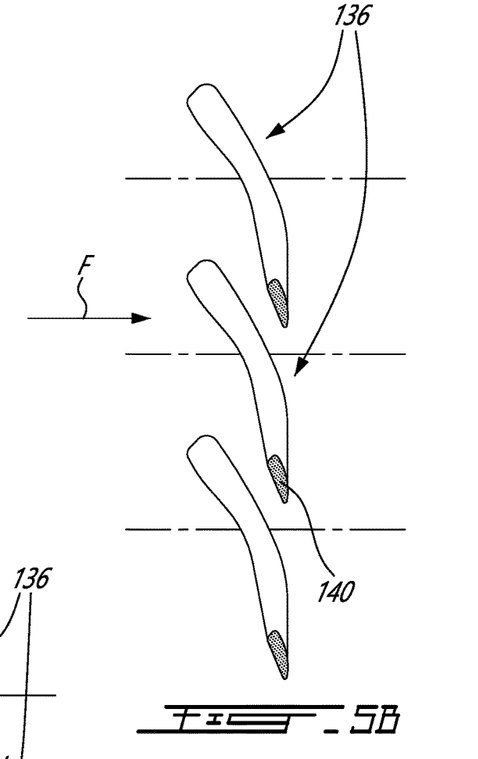
FIG. 5B is a cross-sectional view of variable guide vanes of the assembly of FIG. 3 shown in a second open position.
Figure 5C:
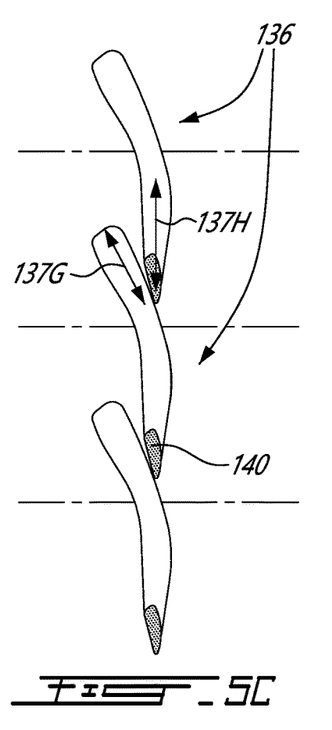
FIG. 5C is a cross-sectional view of variable guide vanes of the assembly of FIG. 3 shown in a closed position.

Referring to FIG. 5A with continued reference to FIGS. 3-4, in the embodiment shown, the vanes 136 are in an open position to guide the air flow F towards the compressor, whether it be the LP compressor 12 (FIG. 1) of the HP compressor 14 (FIG. 1). The vanes 136 may be pivoted about their spanwise axes S as shown in FIG. 5B to create a greater obstruction to the air flow F between the vanes 136. However, in this position, the air flow F may still flow between the vanes 136. The vanes 136 of the present embodiment may be pivoted further until leading edge regions 137G of the vanes 136 are contacting trailing edge regions 137H of adjacent vanes 136 as shown in FIG. 5C. Hence, in the closed positions of the vanes 136, a circumferential overlap in created between each two adjacent ones of the vanes 136. The leading edge regions 137G of one of the vanes 136 may sealingly engage the trailing edge regions 137H of an adjacent one of the vanes 136 to limit the air flow F from flowing between the vanes 136. In the present embodiment, the leading edges 137A of the airfoils 137 are free of contact with the adjacent ones of the airfoils 137. This may avoid rubbing and wearing the leading edges 137A, whose shape may be important for aerodynamic performance of the vanes 136. In the embodiment shown, the leading edge regions 137G include portions of the suction sides 137F of the airfoils 137 and the trailing edge regions 137H include portions of the pressure sides 137E of the airfoils 137. In the present case, the abutment of the leading edge regions 137G and the trailing edge regions 137H define a sealing plane that extend along the spans S of the vanes 136.

It will be appreciated that other configurations are contemplated. For instance, the leading and trailing edges may abut one another in the closed positions of the vanes 136 such that a sealing line is created long the respective leading and trailing edges from the inner ends 137C to the outer ends 137D.

In some embodiments, a shape of the trailing edge regions 137H is designed to match and/or to be complementary to a shape of the leading edge regions 137G, such as to create the aforementioned sealing engagement (i.e. a seal) between two adjacent vanes 136. In the embodiment shown, seals 140 may be provided on the trailing edge regions 137H to assist in creating this sealing engagement. The seals 140 may be made of an elastomeric material such as rubber. In some cases, brush seals may be provided as the seals 140. Any suitable seal may be used without departing from the scope of the present disclosure. Any compliant material (e.g., rubber, brush seal, etc) may be used at the inner and outer ends of the vanes for proper sealing.

Referring more particularly to FIG. 3, in the embodiment shown, the inner wall 150 defines inner faces 150A circumferentially distributed about the central axis 30. A shape of the inner faces 150A is complementary to a shape of the inner ends 137C of the airfoils 137, so as to form a seal between the inner ends 137C of the airfoils 137 and the inner faces 150A of the inner wall/vane ring, when the vanes 136 are in their closed positions. In other words, the inner ends 137C of the airfoils 137 are sealingly engaged to the inner faces 150A, so as to form this radially inner seal that, collectively, forms the full circumference at the interface between the radially inner ends of the vanes 136 and the inner wall/vane ring. The inner faces 150A may be flat. In the present embodiment, the inner wall 150 has a polygon shape with a number of the inner faces 150A corresponding to a number of the vanes 136. For instance, if twenty vanes 136 are present, the inner wall 150 may be shaped as an icosagon. The inner faces 150A may be distributed axisymmetrically around the central axis 30. The inner faces 150A may each face a direction being solely radial relative to the central axis 30. In some cases, the seals 140 may further be provided between the inner ends 137C of the airfoils 137 and the inner faces 150A. The seals 140 may be secured to the inner ends 137C as shown in FIG. 4 or to the inner faces 150A.

In the embodiment shown, to provide the sealing engagement between the adjacent vanes 136, the vanes 136 flare towards the outer wall 151. In other words, inner chords of the airfoils 137 at the inner ends 137C are less than outer chords of the airfoils 137 at the outer ends 137D. This may ensure that an overlap between the leading edge regions 137G and the trailing edge regions 137H is substantially constant along the spans S of the vanes 136. It will be appreciated that some variations of this overlap along the radial direction relative to the central axis 30 may be acceptable.

In the depicted embodiment, the outer wall 151 has a cylindrical shape. Consequently, the outer ends 137D of the airfoils 137 are curved and are designed with a shape that is complementary to a shape of the outer wall 151. For instance, the outer wall 151 may have a diameter and projections of the outer ends 137D of the airfoils 137 on a plane normal to the central axis 30 may define an arc of circle having the same diameter of the outer wall 151. In some cases, the seals 140 may further be provided between the outer ends 137D of the airfoils 137 and the outer wall 151. The seals 140 may be secured to the outer ends 137D as shown in FIG. 4 or to the outer wall 151. The seals 140 may provide a tight fit between the arc of circle and the outer wall 151 for improved sealing. The fit may be adjusted to be tighter when the VGV are in the closed configuration. The seals 140 may have a similar effect at the inner wall.

Figure 6:
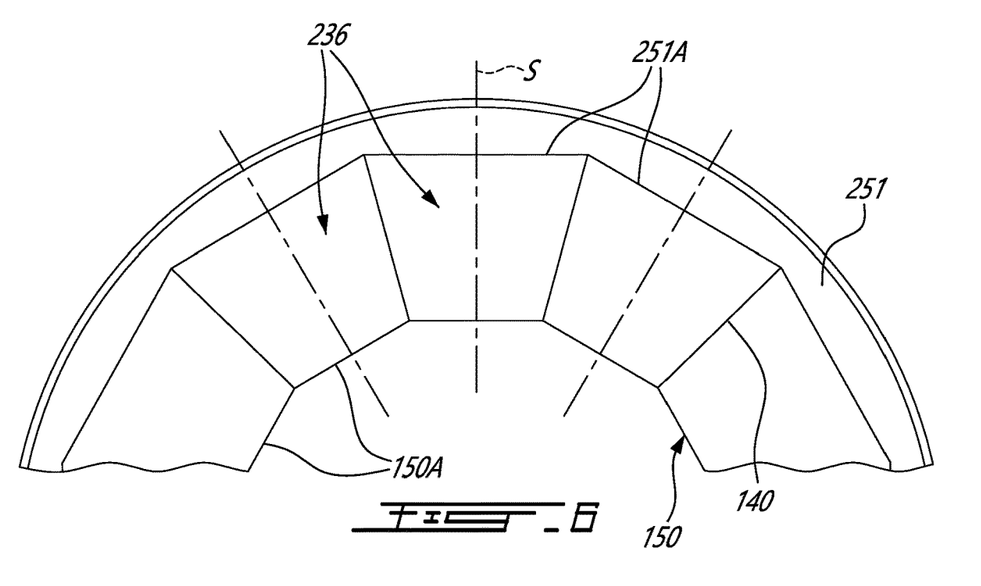
FIG. 6 is another exemplary front schematic view of a variable guide vane assembly in accordance with another embodiment.
Figure 7:
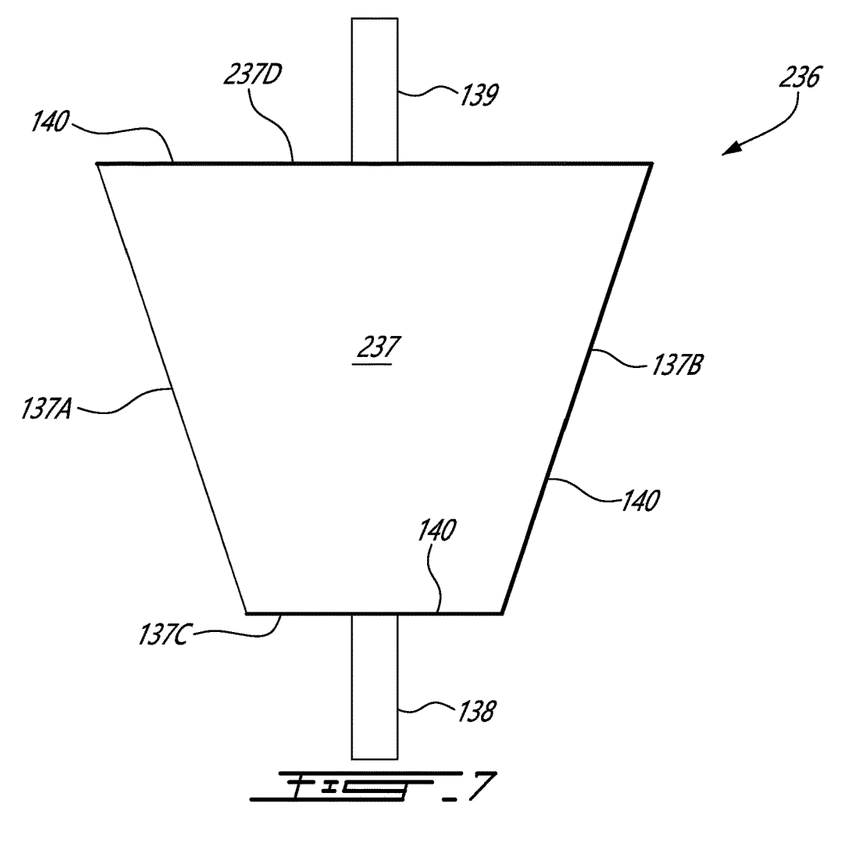
FIG. 7 is a schematic plan view of a variable guide vane of the assembly of FIG. 6.

Referring to FIGS. 6-7, another embodiment of a variable guide vane assembly is shown and described below. For the sake of conciseness, only elements that differ from the variable guide vane assembly described above with reference to FIGS. 3-4 are described below.

In the embodiment shown, the outer wall 251 defines outer faces 251A circumferentially distributed about the central axis 30. In certain embodiments, therefore, a shape of the outer faces 251A is complementary to a shape of the outer ends 237D of the airfoils 237, so as to form a seal between the outer ends 237D of the airfoils 237 and the outer faces 251A (i.e. they are sealingly engaged with each other), when the vanes 236 are in their closed positions. The outer faces 251A may be flat. In such a case, no gap may be present between the outer ends 237D of the airfoils 237 and the outer wall 251, which may provide for a better sealing. This may be achieved by having the outer ends 237D flush with the outer wall 251 when the vanes 236 are in their closed positions. In the present embodiment, the outer wall 241 has a polygon shape with a number of the outer faces 251A corresponding to a number of the vanes 236. For instance, if twenty vanes 236 are present, the outer wall 251 may be shaped as an icosagon. The outer faces 251A may be distributed axisymmetrically around the central axis 30. The outer faces 251A may each face a direction being solely radial relative to the central axis 30. In some cases, the seals 140 may further be provided between the outer ends 237D of the airfoils 237 and the outer faces 251A of the outer wall 251. The seals 140 may be secured to the outer ends 237D as shown in FIG. 7 or to the outer faces 251A.

It will be appreciated that the VGVs used to selectively allow or block the flow passage need not extend radially relative to the central axis 30 of the engine 10. The vanes may extend substantially axially relative to the central axis 30 and the flow between the vanes may have a radial component relative to the central axis 30. In such a case, the vanes may have a constant chord between their inner and outer ends.

This configuration of the outer ends 237D may contribute in reducing or eliminating tip clearance leakage when the vanes 236 are angled in one of the one or more open positions as depicted in FIGS. 5A and 5B. This may contribute in reducing aerodynamic losses.

Figure 8:
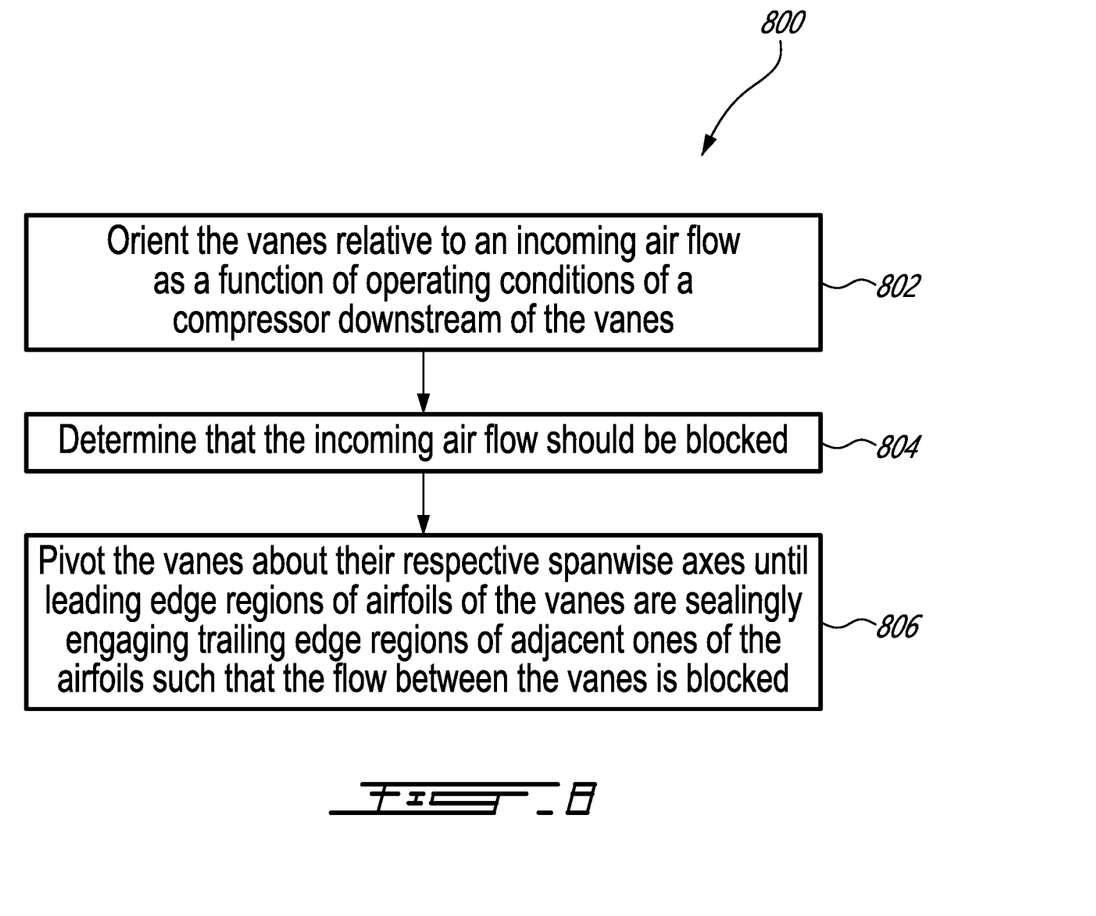
FIG. 8 is a flow chart illustrating a method of operating a variable guide vane assembly.

Referring now to FIG. 8, a method of operating a variable guide vane assembly is shown at 800. The method 800 includes orienting the vanes 136, 236 relative to the incoming air flow F as a function of operating conditions of the compressor (e.g., LP compressor 12, HP compressor 14) downstream of the vanes 136, 236 at 802. This may include determining an optimal angle of attack between the vanes 136, 236 as a function of the operating conditions. The method 800 includes determining that the incoming air flow F should be blocked at 804; and pivoting the vanes 136, 236 about their respective spanwise axes S until the leading edge regions 137G of the airfoils 137, 237 of the vanes 136, 236 are sealingly engaging trailing edge regions 137H of adjacent ones of the airfoils 137, 237 such that the flow between the vanes 136, 236 is blocked at 806.

The determining that the incoming air flow F should be blocked at 804 includes determining that the aircraft engine is to be operated in a low power mode. The pivoting of the vanes 136, 236 at 806 may include pivoting the vanes 136, 236 until the inner ends 137C of the airfoils 137, 237 are sealingly engaged to the inner faces 150A defined by the inner wall 150. The pivoting of the vanes 136, 236 at 806 may further include pivoting the vanes 136, 236 until the outer ends 137D, 237D of the airfoils 137, 237 are sealingly engaged to the outer faces 251A defined by the outer wall 251. In such a case, no gap may be present between the inner ends 137C of the airfoils 137 and the inner wall 150, which may provide for a better sealing. This may be achieved by having the inner ends 137C flush with the inner wall 150 when the vanes 236 are in their closed positions.

The variable guide vane assembly may be operatively connected to the controller 29, which may be operable to determine when the vanes should block the airflow and which may be operable to control any suitable components operable to pivot the vanes 136, 236 about their respective spanwise axes S. These suitable components may include, for instance, unison ring engaged by an actuator and engaging vane arms secured at the outer stems 139 of the vanes 136, 236 as described in U.S. patent application Ser. No. 17/108,937 filed on Dec. 1, 2020, the entire contents of which are incorporated herein by reference. The controller 29 may be operatively connected to the actuator to move the unison ring thereby pivoting the vanes 136, 236 about their respective spanwise axes S.

The controller 29 may timely control the closing of the vanes 136, 236 as a function of various engine parameters to temporarily seal the compressor gas path upon various off-design engine maneuvers, such as a bypass of the LP compressor 12, emergency re-start or re-acceleration upon compressed air injection, FOD avoidance, and so on.

Figure 9:
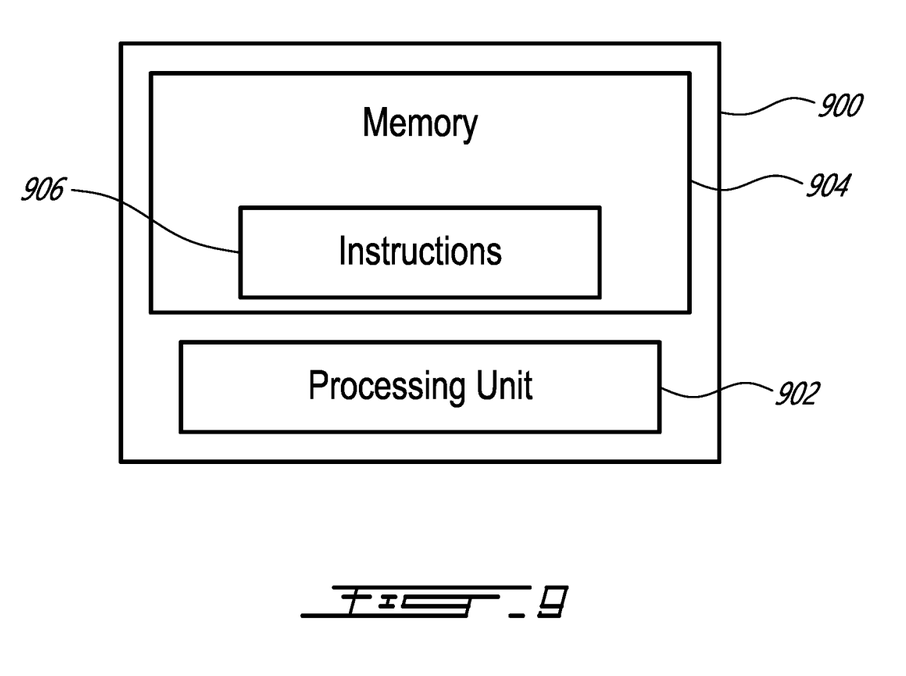
FIG. 9 is a schematic representation of a computing device in accordance with one embodiment.

With reference to FIG. 9, an example of a computing device 900 is illustrated. For simplicity only one computing device 900 is shown but the system may include more computing devices 900 operable to exchange data. The computing devices 900 may be the same or different types of devices. The controller 29 may be implemented with one or more computing devices 900. Note that the controller 29 can be implemented as part of a full-authority digital engine controls (FADEC) or other similar device, including electronic engine control (EEC), engine control unit (ECU), electronic propeller control, propeller control unit, and the like. In some embodiments, the controller 29 is implemented as a Flight Data Acquisition Storage and Transmission system, such as a FAST™ system. The controller 29 may be implemented in part in the FAST™ system and in part in the EEC. Other embodiments may also apply.

The computing device 900 comprises a processing unit 902 and a memory 904 which has stored therein computer-executable instructions 906. The processing unit 902 may comprise any suitable devices configured to implement the method 800 such that instructions 906, when executed by the computing device 900 or other programmable apparatus, may cause the functions/acts/steps performed as part of the method 800 as described herein to be executed. The processing unit 902 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 904 may comprise any suitable known or other machine-readable storage medium. The memory 904 may comprise non-transitory computer readable storage medium, for example, but not limited to, an electronic, magnetic, optical, electromagnetic, infrared, or semiconductor system, apparatus, or device, or any suitable combination of the foregoing. The memory 904 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 904 may comprise any storage means (e.g., devices) suitable for retrievably storing machine-readable instructions 906 executable by processing unit 902.

The methods and systems for operating a variable guide vane assembly described herein may be implemented in a high level procedural or object oriented programming or scripting language, or a combination thereof, to communicate with or assist in the operation of a computer system, for example the computing device 900. Alternatively, the methods and systems for operating a variable guide vane assembly may be implemented in assembly or machine language. The language may be a compiled or interpreted language. Program code for implementing the methods and systems for operating a variable guide vane assembly may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for operating a variable guide vane assembly may also be considered to be implemented by way of a non-transitory computer-readable storage medium having a computer program stored thereon. The computer program may comprise computer-readable instructions which cause a computer, or more specifically the processing unit 902 of the computing device 900, to operate in a specific and predefined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A variable guide vane assembly for an aircraft engine, comprising:
variable guide vanes circumferentially distributed about a central axis, the variable guide vanes having airfoils extending from inner ends to outer ends, the variable guide vanes pivotable about respective spanwise axes between one or more open positions and a closed position, wherein in the closed position, trailing edge regions of the airfoils sealingly engage leading edge regions of adjacent ones of the airfoils to block an air flow between the variable guide vanes;
an outer wall circumferentially extending around the central axis, the outer ends of the variable guide vanes being pivotably engaged to the outer wall; and
an inner wall circumferentially extending around the central axis, the inner ends of the variable guide vanes being pivotably engaged to the inner wall, the inner wall defining inner faces circumferentially distributed about the central axis, a shape of the inner faces being complementary to a shape of the inner ends of the airfoils to form a seal between the inner ends of the airfoils and the inner faces when the variable guide vanes are in the closed position.

2. The variable guide vane assembly of claim 1, wherein an inner chord of the airfoils at the inner ends are less than outer chords of the airfoils at the outer ends.

3. The variable guide vane assembly of claim 1, wherein the inner wall has a polygon shape defining the inner faces.

4. The variable guide vane assembly of claim 3, wherein each of the inner faces is oriented in a direction being solely radial relative to the central axis.

5. The variable guide vane assembly of claim 1, wherein the outer wall defines outer faces circumferentially distributed about the central axis, a shape of the outer faces being complementary to a shape of the outer ends of the airfoils to form a seal between the outer ends of the airfoils and the outer faces when the variable guide vanes are in their closed positions.

6. The variable guide vane assembly of claim 5, wherein the outer wall has a polygon shape defining the outer faces.

7. The variable guide vane assembly of claim 6, wherein each of the outer faces is oriented in a direction being solely radial relative to the central axis.

8. The variable guide vane assembly of claim 6, comprising a seal between the outer ends of the airfoils and the outer faces of the outer wall.

9. The variable guide vane assembly of claim 8, wherein the seal is secured to the outer ends of the airfoils.

10. The variable guide vane assembly of claim 1, wherein the leading edge regions include portions of suction sides of the airfoils.

11. The variable guide vane assembly of claim 1, wherein the trailing edge regions include portions of pressure sides of the airfoils.

12. The variable guide vane assembly of claim 1, comprising a seal secured to the trailing edge regions of the airfoils.

13. The variable guide vane assembly of claim 12, wherein the seal is made of an elastomeric material.

14. The variable guide vane assembly of claim 1, wherein leading edges of the airfoils are free of contact with the adjacent ones of the airfoils.

15. The variable guide vane assembly of claim 1, comprising a seal between the inner ends of the airfoils and the inner faces of the inner wall.

16. The variable guide vane assembly of claim 15, wherein the seal is secured to the inner ends of the airfoils.

* * * * *